Figure 1:
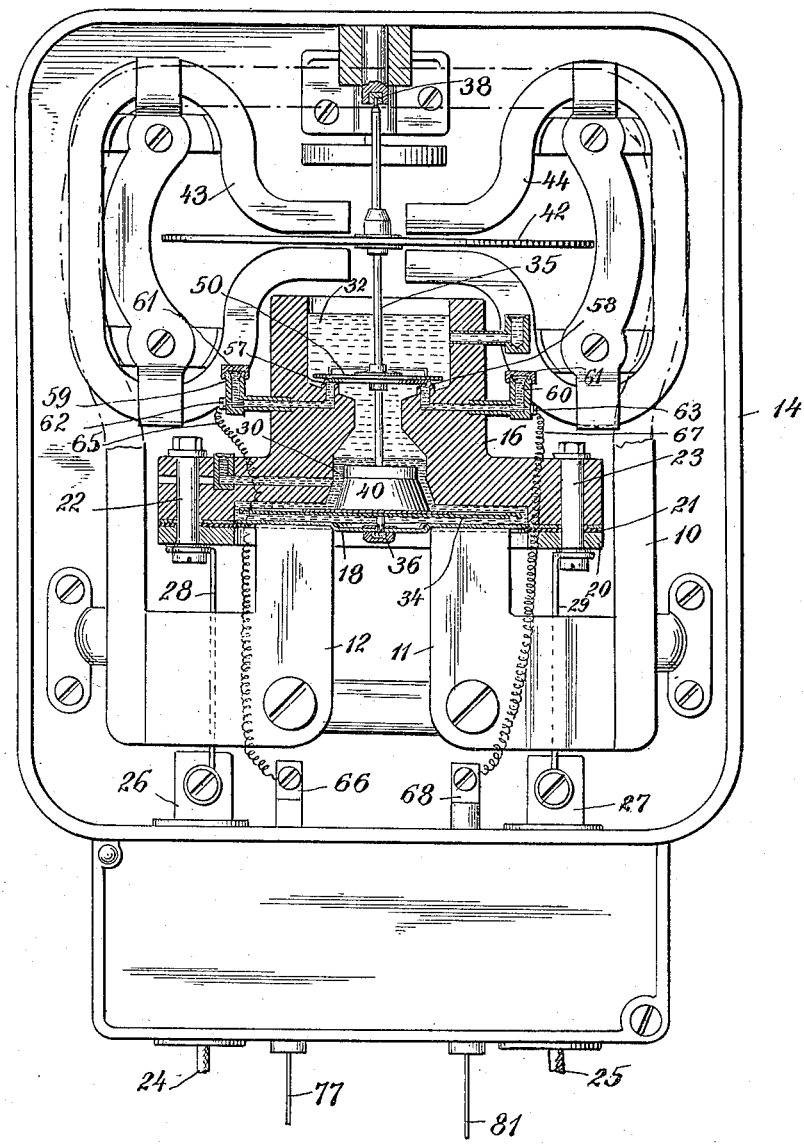

E. H. MESSITER.
ELECTRIC COUNTER ATTACHMENT FOR ROTARY METERS.
APPLICATION FILED MAR. 22, 1912.

1,163,765.

Patented Dec. 14, 1915.
2 SHEETS—SHEET 1.

WITNESSES:
William J. Sperl
Leon H. Campbell Jr.

INVENTOR
Edwin H. Messiter
BY
E. W. Marshall
ATTORNEY

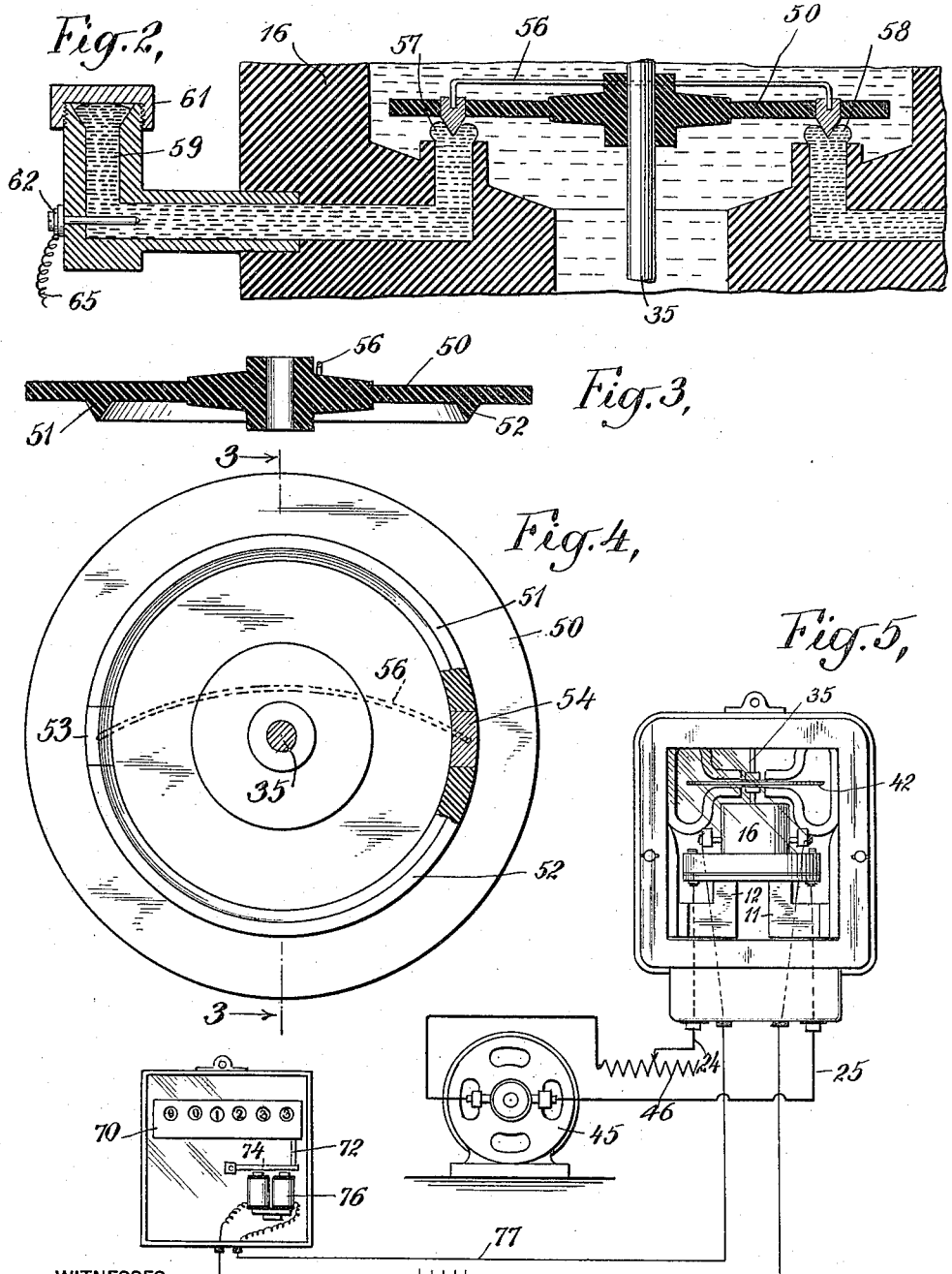

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

ELECTRIC COUNTER ATTACHMENT FOR ROTARY METERS.

1,163,765.   Specification of Letters Patent.   Patented Dec. 14, 1915.

Application filed March 22, 1912. Serial No. 685,482.

*To all whom it may concern:*

Be it known that I, EDWIN H. MESSITER, a citizen of the United States of America, and a resident of Brooklyn, county of Kings, and State of New York, have invented certain new and useful Improvements in Electric Counter Attachments for Rotary Meters, of which the following is a specification, reference being had to the accompanying drawings, forming a part thereof.

This invention relates to rotation counters and particularly to electric actuators and controllers therefor.

One object of the invention is to provide an improved circuit closing device.

Another object is to provide a simple and effective circuit controller attachment for electric meters, that shall be adapted to govern an electrically operated rotation counter.

Other objects and advantages of the invention will be set forth hereinafter.

I will describe my invention in the following specification and point out the novel features thereof in the appended claims.

In the accompanying drawings, Figure 1 is a front elevation of an electric meter embodying a circuit controller which is arranged and constructed in accordance with this invention, the meter cover being removed and the controller shown in section. A portion of the controller apart from the meter is shown in section on a larger scale in Fig. 2. Fig. 3 is a central vertical section on line 3—3 of Fig. 4 and Fig. 4 is a bottom plan view partly in section, of the rotary contact-carrier which forms a part of the circuit controller of Figs. 1 and 2. Fig. 5 is a diagrammatic view of a system in which the meter together with the circuit controller is employed.

As illustrated in said drawings the invention is applied to a well known form of electric meter comprising a magnet 10, having poles 11 and 12, and mounted within a protecting casing 14. Mounted above the poles 11 and 12 is a casing 16, of insulating material which is closed at the bottom by a non-magnetic plate 18 of high resistance metal held in place by an annular plate 20. The plate 20 is insulated from the bottom plate 18 by a ring of insulation 21, and they are clamped together by bolts or binding posts 22 and 23. The main current conductors 24, 25 are connected to binding posts 26, 27 respectively, which in turn, are connected by conductors 28, 29 with the binding posts 22, 23, respectively.

The lower portion of the chamber within the casing 16 is filled with mercury 30 and the upper portion of said chamber contains oil 32, the purpose of the oil being to prevent oxidation of the mercury. Rotatable within the mercury is a copper disk 34 mounted on a shaft 35. This shaft is journaled at its lower end in a step bearing or jewel 36 carried by the plate 18, and the upper end of said shaft is journaled in a bearing 38. In order to relieve the end pressure of the shaft 35 against the bearing 36, a float 40 is mounted on said shaft above the disk 34. The rotation of the shaft is retarded by a damping disk 42 of aluminum, which rotates between the poles of oppositely disposed magnets, 43, 44.

As illustrated in Fig. 5, the meter may be installed in a circuit fed by a generator 45 and composed of conductors 24, 25 and a variable resistance 46. The current enters the meter through the conductors 24, 28, post 22, plate 18, mercury 30, copper disk 34, mercury 30 again, plate 18, post 23, and conductors 29 and 25. The metal plate 18 is of high resistance material and consequently the circuits are established through the mercury as above described and only a very small proportion of the current leaks through the plate. This portion of the apparatus and its action are well known and need not be further described.

The present illustrative embodiment of the circuit controlling device comprises a disk 50, of insulating material mounted to rotate with the shaft 35 and provided with a pair of wedge-shaped semi-annular ribs 51—52 on its under side. Between these ribs at diametrically opposed points are contacts 53, 54 having their under surfaces corresponding to that of the ribs 51 and 52, the whole forming an annular wedge shaped rib. The contacts 53 and 54 are electrically connected by a conductor 56 passing across the top of the disk 50. The wedge-shaped rib on the under side of the disk 50 rests upon the upper surfaces of vertical columns of mercury 57 and 58, which are in communication with reservoirs 59 and 60, respectively, in which the upper surface of the mercury is higher than the upper surfaces of the columns. This causes the upper surfaces of the columns 57 and 58 to be forced against the under side of the rib on the disk, and the surface tension of the mercury is such that it can assume a bulging shape yet not spill over the edge of the supporting walls of the vertical column. By this construction the friction between the upper mercury surfaces and the annular rib is constant, so that there is no retardation produced when the contacts 53 and 54 enter or leave the mercury. The upper ends of the reservoirs 59 and 60 may be closed by caps 61. Binding posts 62 and 63 project through the walls of the reservoirs 59 and 60, respectively into the mercury. The binding post 62 is connected by a conductor 65 with a binding post 66, and the binding post 63 is connected by a conductor 67 with a binding post 68. The binding posts 66 and 68 are connected to an auxiliary circuit which operates a registering device or counter 70. The counter may be of any well known form such as one comprising a train which is operated by a rod 72 connected to the armature 74 of a magnet 76. One coil of the magnet 76 is connected by a conductor 77 to the binding post 66, the other coil of said magnet is connected by a conductor 78 with one pole of a battery 80, and the other pole of said battery is connected by a conductor 81 with the binding post 68. Thus it will be seen that when the shaft 35 is rotated the auxiliary circuit through the contacts 53, 54 is closed twice during each revolution of the shaft, thereby causing an intermittent current to pass through said circuit from the battery 80 and energize the magnet 76 to operate the counter 70.

The circuit controlling device is not necessarily embodied in an electric meter structure nor is it essentially used with an actuator of the type illustrated. I therefore desire that only such limitations be imposed as are indicated in the appended claims.

What I claim is:—

1. In a circuit interrupter, a rotary shaft, a contact carrier on said shaft having a plurality of contacts mounted thereon, and a plurality of conducting liquid surfaces in continuous contact with said carrier.

2. In a circuit interrupter, a rotary shaft, a contact carrier on said shaft having an annular rib, a contact located in said rib and having its contacting surface corresponding to that of the remainder of the rib, and a conducting liquid surface in continuous contact with said rib.

3. In a circuit interrupter, a rotary shaft, a disk on said shaft having an annular rib composed of conducting and non-conducting sections, and a conducting liquid surface in continuous contact with said rib.

4. In a circuit interrupter, a rotary shaft, a contact carrier on said shaft, a column of mercury having its upper surface in continuous contact with said carrier, and a reservoir of mercury communicating with said column and having a head sufficient to maintain the surface of said column under tension against said carrier.

In witness whereof, I have hereunto set my hand this 15th day of March 1912.

EDWIN H. MESSITER.

Witnesses:
F. B. GRAVES,
ERNEST W. MARSHALL.

Copies of this patent may be obtained for five cents each, by addressing the "Commissioner of Patents, Washington, D. C."